Oct. 12, 1943.  E. E. BARKSTROM ET AL  2,331,647
RETAINER
Filed Nov. 10, 1942
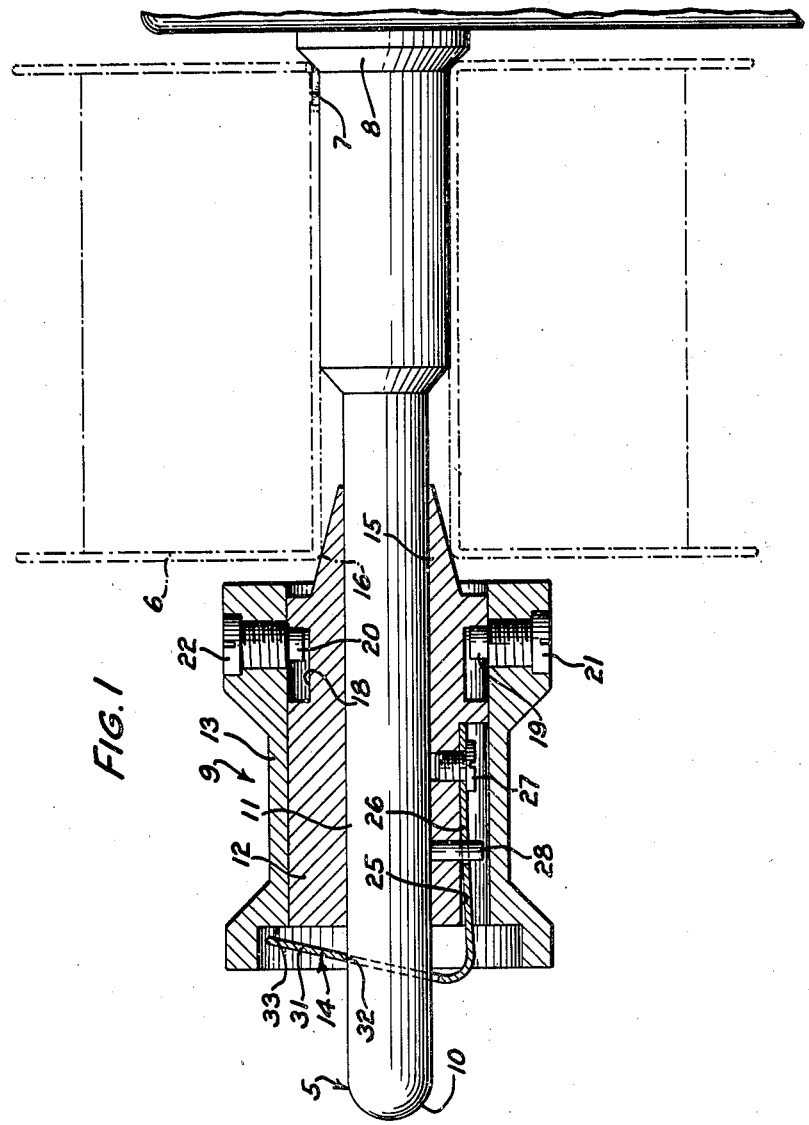
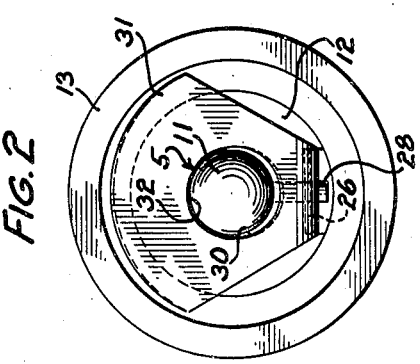
INVENTORS
E. E. BARKSTROM
H. M. LARSEN
BY *Harry C. Swift*
ATTORNEY Patented Oct. 12, 1943

2,331,647

UNITED STATES PATENT OFFICE 2,331,647

RETAINER

Elmer E. Barkstrom, Chicago, and Henry M. Larsen, La Grange Park, Ill., assignors to Western Electric Company, Incorporated, New York, N. Y., a corporation of New York Application November 10, 1942, Serial No. 465,174

8 Claims. (Cl. 287—52)

This invention relates to retainers and more particularly to a retainer for locking a spool on an arbor.

It is an object of the present invention to provide a retainer which may be quickly slipped into position to lock one member with respect to another and which may just as quickly be removed to release the members from locking engagement.

In accordance with one embodiment of the invention, a retainer is provided for holding a spool on an arbor, wherein a cone for engaging the hub of the spool has a leaf spring attached to it and bent normally to grip the surface of the arbor at an angle such that pressure applied to the cone by the spool will tend to tighten the engagement of the spring with the arbor and wherein a sleeve surrounds the spring and cone for engaging the free end of the spring to release the retainer from the arbor when the sleeve is pulled away from the spool.

A better understanding of the invention will be had from the following detailed description when considered in conjunction with the accompanying drawing, wherein Fig. 1 is a longitudinal sectional view taken through a retainer made in accordance with the preferred embodiment of the invention and Fig. 2 is an end elevational view of the retainer showing the configuration of the spring and its relation to the slidable sleeve.

Referring to the drawing, wherein like reference characters designate the same parts throughout the several views, it will be noted that the retainer is adapted for use with a spool arbor 5, on which it is desired to lock a reel or spool 6. As is usual in such constructions, the arbor is provided with a key 7, adapted to engage a suitable slot formed in the hub of the spool 6 to prevent the spool from rotating with respect to the arbor when the spool is forced against a tapered shoulder 8 on the arbor by any retainer member, such as the retainer member designated generally by the numeral 9. The left end (Fig. 1) of the arbor 5 is rounded, as shown at 10, to permit the retainer 9 to be readily slipped onto a reduced portion 11 of the arbor.

The retainer member 9 comprises three primary elements: a sleeve 12, a sleeve 13, and a spring 14. The sleeve 12 terminates at its right end in a conically shaped portion 15 adapted to engage a central aperture 16 in the spool 6 to force the spool into locking engagement with the key 7 and tapered shoulder 8. Adjacent the cone-shaped portion 15 of the sleeve 12, a circumferential groove 18 is formed in the sleeve to receive the reduced portions 19 and 20 of a pair of set screws 21 and 22, which are threaded into the sleeve 13 and have their reduced portions 19 and 20 extending into the groove 18 in order to retain the sleeve 13 in place upon the sleeve 12 while permitting relative rotation between the sleeves. The sleeve 12 has a longitudinally extending groove 25 formed in it extending from its left end toward its right end for receiving a reduced portion 26 of the spring 14, a screw 27 threaded into the sleeve 12 serving to retain the spring 14 attached to the sleeve 12 and a pin 28 set into the sleeve 12 serving to prevent movement of the spring 14 transversely to the axis of the sleeve 12 while permitting it to flex from the point of its attachment to the sleeve 12 by the screw 27.

The spring 14 is provided with an aperture 30 just slightly larger than the reduced portion 11 of the arbor 5 and the spring has a bent-over portion, as shown at 31, so that when the sleeve 12 is slipped onto the arbor, the upper edge 32 (Fig. 2) of the spring will slide along the reduced portion 11 of the arbor 5, the spring flexing about its point of attachment to the sleeve 12. Thus, the sleeve 12 and attached sleeve 13 and spring 14 may be readily slipped onto the arbor 5. However, if pressure is applied to the sleeve 12, tending to move it to the left, the upper edge 32 of the spring will tend to bite into the reduced portion 11 of the arbor, thereby to prevent the sleeve 12 from moving to the left.

At its upper end, as shown in Fig. 2, the spring 14 is rounded and extends beyond the periphery of the sleeve 12 to a position to be engaged by a shoulder 33 formed in the interior of the sleeve 13. Thus, the gripping action of the spring 14 on the arbor 5 may be released by shifting the sleeve 13 to the left relative to the sleeve 12 for when the sleeve 13 is shifted to the left with respect to the sleeve 12, the shoulder 33 will flex the bent-over portion 31 of the spring 14 in a direction to move the edge 32 of its aperture 30 out of engagement with the reduced portion of the arbor 5.

In the operation of the apparatus, a spool 6 may be readily mounted upon or removed from the arbor 5 and attached thereto by an operator slipping the retainer 9 onto the reduced portion 11 of the arbor. When the retainer 9 is pushed onto the arbor 5, the spring 14 will flex counterclockwise (Fig. 1) about its point of attachment to the sleeve 12 and will have very little resistance to the movement of the retainer with respect to the arbor. In moving to the position to lock the spool 6 on the arbor 5, the sleeve 13, through the action of the screws 21 and 22, will push the sleeve 12 to a position where the conical portion 15 thereof will be in engagement with the edge of the spool aperture 16 and lock the spool against the key 7. When it is desired to replace the spool 6 with another similar spool, an operator may grasp the sleeve 13, which is freely rotatable with respect to the sleeve 12, and by simply drawing the sleeve 13 to the left, will release the spring 14 from the arbor and cause the sleeve 12 to which the spring is attached to be moved to the left (Fig. 1).

We claim:

1. A retainer for holding spools on arbors comprising a pair of co-axially mounted sleeves, spool engaging means mounted on one of said sleeves, and a spring having an arbor engaging edge fixed to said spool engaging sleeve and having another edge engageable by the other sleeve to release the arbor engaging edge from the arbor.

2. A retainer for holding a spool on an arbor comprising an inner sleeve member slidable with respect to the arbor, a spring fastened to said sleeve and having a surface for normally engaging the arbor to prevent movement of the sleeve axially of the arbor in one direction, and means encircling the inner sleeve and engageable with the spring to move the spring out of engagement with the arbor.

3. A retainer for holding a spool on an arbor comprising an inner sleeve slidable on the arbor for engagement with the spool, a leaf spring having one end attached to the inner spool and being bent at an acute angle to the axis of the arbor and normally carrying one surface in position to grip the arbor, and an outer sleeve mounted for limited axial movement on the inner sleeve for disengaging the arbor engaging surface of the spring out of engagement with the arbor.

4. A retainer for holding a spool on an arbor comprising an inner sleeve slidable on the arbor for engagement with the spool, a leaf spring having one end attached to the inner spool and being bent at an acute angle to the axis of the arbor and normally carrying one surface in position to grip the arbor, and an outer sleeve mounted for limited axial movement on the inner sleeve for disengaging the arbor engaging surface of the spring out of engagement with the arbor, said outer sleeve being freely rotatable with respect to the inner sleeve.

5. A retainer for holding spools on arbors comprising a tubular member having an inner surface for engaging the arbor and having a conical end for engaging a spool, said tubular member having a circumferential groove formed in it and an axially extending groove adjacent one end, a sleeve surrounding and rotatable with respect to said tubular member, means fixed to said sleeve and extending into the circumferential groove to permit a small amount of movement of the sleeve axially of the tubular member, an inner annular shoulder formed on said sleeve, a spring having a reduced portion extending into said axially extending groove and attached to said tubular member, and a bent-over portion formed on said spring having an edge normally urged to engage the circumference of the arbor and having another edge positioned in the path of movement of the shoulder on the sleeve when the sleeve is moved axially of the tubular member in one direction.

6. A retainer for holding spools on arbors comprising a tubular member slidable on said arbor and having a tapered end for engaging a spool, a sleeve surrounding said tubular member and rotatable with respect thereto, means on said sleeve to prevent movement of said sleeve relative to said spool beyond a predetermined amount, and a spring attached to said tubular member and having a bent-over portion provided with one edge for gripping the arbor and a second edge for engagement by the sleeve upon movement of the sleeve with respect to the tubular member to move the one edge out of gripping engagement with the arbor.

7. A retainer for holding spools on arbors comprising a tubular member slidable on said arbor and having a tapered end for engaging a spool, a sleeve surrounding said tubular member, means on said sleeve to prevent movement of said sleeve relative to said spool beyond a predetermined amount, and a spring attached to said tubular member and having one edge for gripping the arbor and a second edge for engagement by the sleeve upon movement of the sleeve with respect to the tubular member to move the one edge out of gripping engagement with the arbor.

8. A retainer for holding spools on arbors comprising a tubular member slidable on said arbor and having a tapered end for engaging a spool, a sleeve surrounding said tubular member, means on said sleeve to prevent movement of said sleeve relative to said spool beyond a predetermined amount, and a spring attached to said tubular member and having a portion disposed at an acute angle to the arbor, said portion having one edge for gripping the arbor and a second edge for engagement by the sleeve upon movement of the sleeve with respect to the tubular member to move the one edge out of gripping engagement with the arbor by flexing the spring to move said portion toward a right angle position with respect to the arbor.

ELMER E. BARKSTROM.
HENRY M. LARSEN.